US008950768B2

(12) United States Patent
Nihei

(10) Patent No.: US 8,950,768 B2
(45) Date of Patent: Feb. 10, 2015

(54) AIR CELLULAR CUSHION

(75) Inventor: Hideki Nihei, Kanagawa (JP)

(73) Assignee: The Yokohama Rubber Company, Limited, Tokyo (JP)

( * ) Notice: Subject to any disclaimer, the term of this patent is extended or adjusted under 35 U.S.C. 154(b) by 593 days.

(21) Appl. No.: 13/228,259

(22) Filed: Sep. 8, 2011

(65) Prior Publication Data

US 2012/0061943 A1 Mar. 15, 2012

(30) Foreign Application Priority Data

Sep. 13, 2010 (JP) ................................ 2010-204807
Apr. 26, 2011 (JP) ................................ 2011-097881

(51) Int. Cl.

*B62M 1/14* (2006.01)
*A61G 5/10* (2006.01)
*A47C 4/54* (2006.01)
*A47C 7/02* (2006.01)
*A47C 27/08* (2006.01)
*A61G 7/057* (2006.01)

(52) U.S. Cl.

CPC ................ *A61G 5/1043* (2013.01); *A47C 4/54* (2013.01); *A47C 7/021* (2013.01); *A47C 27/083* (2013.01); *A61G 7/05769* (2013.01); *A61G 2005/1045* (2013.01); *A61G 2203/34* (2013.01)

USPC .............. 280/250.1; 280/304.1; 5/654; 5/713

(58) Field of Classification Search

CPC ....................................................... A47C 27/10

USPC ........... 5/710, 713, 715, 654, 655.3; 137/861, 137/863; 297/284.3, 452.41; 33/613, 645, 33/832, 833; 701/36; 700/301; 280/250.1, 280/304.1

See application file for complete search history.

(56) References Cited

U.S. PATENT DOCUMENTS

| | | | | |
|---|---|---|---|---|
| 5,052,068 A | | 10/1991 | Graebe | |
| 5,815,864 A | * | 10/1998 | Sloop | 5/706 |
| 6,115,860 A | * | 9/2000 | Vrzalik | 5/715 |
| 6,943,694 B1 | * | 9/2005 | Ellis | 340/666 |
| 7,378,975 B1 | * | 5/2008 | Smith et al. | 340/573.1 |
| 7,414,536 B2 | * | 8/2008 | Call et al. | 340/606 |
| 8,024,828 B2 | * | 9/2011 | Nihei et al. | 5/654 |

(Continued)

FOREIGN PATENT DOCUMENTS

| | | | |
|---|---|---|---|
| CN | 2012266324 | Y | 7/2009 |
| EP | 1 716 835 | A1 | 11/2006 |

(Continued)

OTHER PUBLICATIONS

European Office Action for the Application No. 11 180 350.8 dated Aug. 6, 2013.

(Continued)

*Primary Examiner* — Joseph M Rocca
*Assistant Examiner* — Daniel Yeagley
(74) *Attorney, Agent, or Firm* — Cheng Law Group, PLLC

(57) ABSTRACT

An air cellular cushion according to one aspect of the present disclosure includes: a plurality of air cells; a sensor configured to detect an air cell collapsing to a bottom; a parameter measuring unit configured to measure a parameter indicating a collapse state of the air cell collapsing to the bottom; an indicator configured to output an indication; and a control unit configured to change the indication output from the indicator based on a parameter value measured by the parameter measuring unit.

19 Claims, 15 Drawing Sheets

(56) References Cited

U.S. PATENT DOCUMENTS

| | | | | |
|---|---|---|---|---|
| 2002/0027384 | A1 * | 3/2002 | Zur | 297/452.41 |
| 2008/0005843 | A1 * | 1/2008 | Lokhorst et al. | 5/655.3 |
| 2009/0121532 | A1 * | 5/2009 | Kruse et al. | 297/330 |
| 2013/0284274 | A1 * | 10/2013 | Chaffee | 137/14 |

FOREIGN PATENT DOCUMENTS

| | | | |
|---|---|---|---|
| JP | 6-510436 | A | 11/1994 |
| JP | 2008-54874 | A | 3/2008 |
| JP | 2010-46141 | A | 3/2010 |
| WO | WO-97/36521 | A1 | 10/1997 |
| WO | WO-2005/011555 | A1 | 2/2005 |
| WO | WO 2008026701 | A1 * | 3/2008 |
| WO | WO-2011/006093 | A1 | 1/2011 |

OTHER PUBLICATIONS

Extended European Search Report for the Application No. EP 11 18 0350 dated Dec. 5, 2012.

European Search Report for the Application No. 11 180 350.8 dated Aug. 6, 2013.

* cited by examiner

AIR CELLULAR CUSHION

CROSS-REFERENCE TO RELATED APPLICATION

This application is based on Japanese Patent Application No. 2010-204807 filed with the Japan Patent Office on Sep. 13, 2010, and Japanese Patent Application No. 2011-097881 filed with the Japan Patent Office on Apr. 26, 2011, the entire contents of which are hereby incorporated by reference herein.

BACKGROUND

1. Technical Field

The present disclosure relates to an air cellular cushion to be placed on the seating surface of a wheelchair or chair, for example.

2. Related Art

An air cellular cushion is used, for example, for preventing the development of decubitus ulcers in a user by softly supporting the buttocks of the user. This type of air cellular cushion is disclosed in JP-T-6-510436 (Patent Document 1), for example. This air cellular cushion includes a flat base member extending along the seating surface of a wheelchair. A plurality of air cells is provided on the base member to support the user's buttocks. This air cellular cushion includes air passages connecting a plurality of air cells, and an air quantity adjuster that adjusts an air quantity inside the air cells through the air passages. The air cell is an air bag in a nearly cylindrical shape extending upward from the top surface of the base member. The air cells are generally horizontally arranged. When the user sits upon the air cells, air inside the air cells moves through the air passages. Thus, the air pressure of the air cells is appropriately adjusted. Therefore, the pressure applied to the user's buttocks is distributed over the buttocks.

SUMMARY

An air cellular cushion according to one aspect of the present disclosure includes: a plurality of air cells; a sensor configured to detect an air cell collapsing to a bottom; a parameter measuring unit configured to measure a parameter indicating a collapse state of the air cell collapsing to the bottom; an indicator configured to output an indication; and a control unit configured to change the indication output from the indicator based on a parameter value measured by the parameter measuring unit.

DESCRIPTION OF EMBODIMENTS

Figure 1:
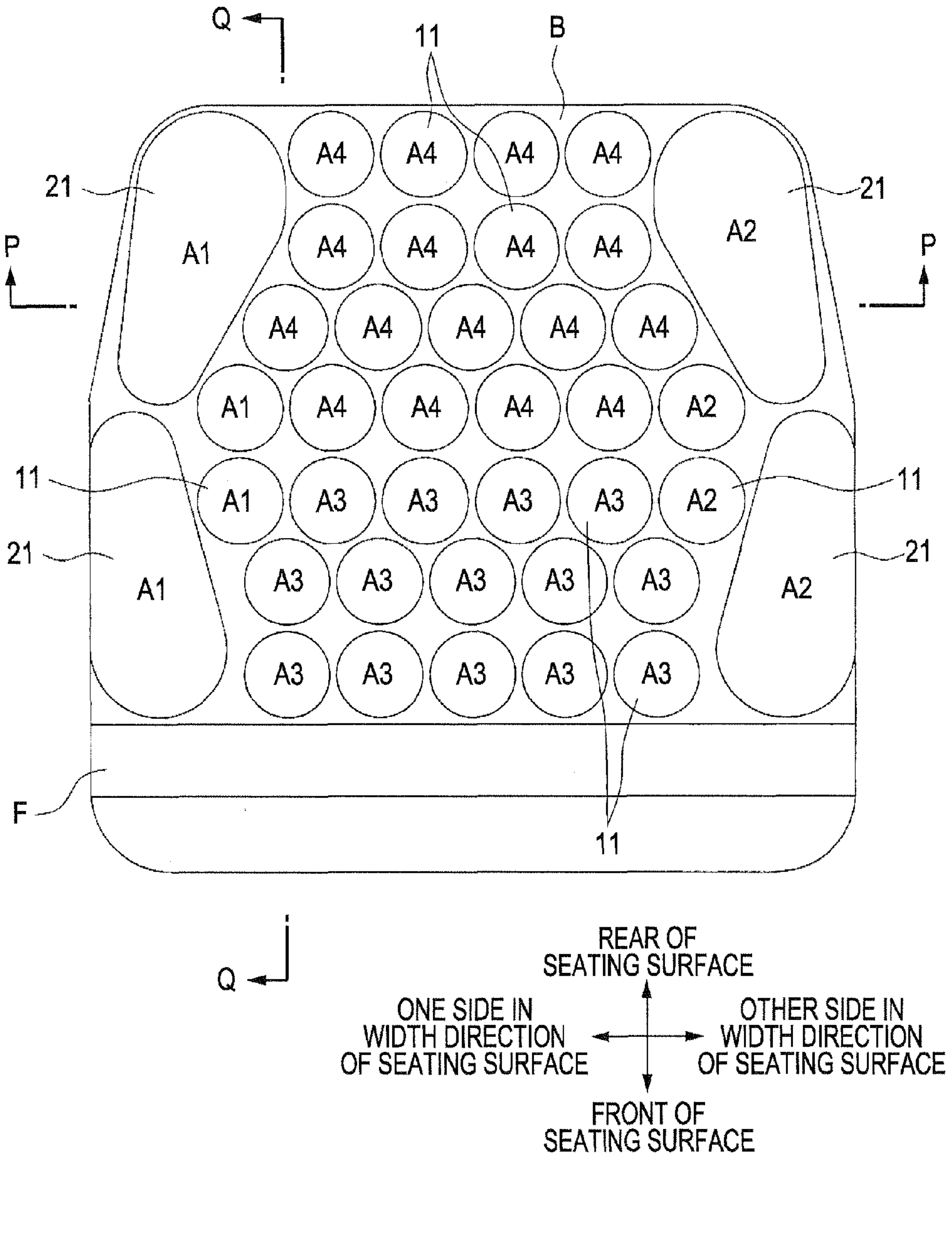
FIG. 1 is a plan view showing an air cellular cushion according to a first embodiment.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically illustrated in order to simplify the drawing.

In the air cellular cushion disclosed in Patent Document 1, it is difficult for the air cells to softly support the user's buttocks when the top end of the air cells vertically collapses close to the base member. This state of the air cells is called a state in which the air cells collapse to the bottom. The air cells having the largest collapse amount are generally air cells supporting near the ischia or the coccyx. The air quantity inside the air cells is made as small as possible while these air cells are prevented from collapsing to the bottom, so that the contact area between the air cells and the user's buttocks can be increased as much as possible. Thus, the pressure applied to the user's buttocks can be effectively distributed. The height of the individual air cells from the base member may be increased in order to implement effective distribution of the pressure applied to the user's buttocks while the collapse of the air cells to the bottom is avoided.

In the cushion, a manual type pump having a rubber ball and an air vent valve is often used for an air supplying device. In this pump, air is supplied to the air cells through the air passages by repeatedly compressing the rubber ball. The air inside the air cells can be evacuated by opening the air vent valve.

The air quantity inside the individual air cells is adjusted as follows, for example. The user sits upon the air cells with the air cells filled with a rather larger quantity of air. The air vent valve is opened in this state, so that the air in the insides of the air cells is gradually evacuated. A nurse, for example, inserts two fingers between near the ischia of the user's buttocks and the base member. When these two fingers are clamped between the buttocks and the base member, the air vent valve is closed. Thus, the air quantity inside the individual air cells is adjusted. The air quantity is adjusted in this manner, so that the contact area between the air cells and the user's buttocks can be increased as much as possible while the collapse of the air cells to the bottom is avoided. A user who uses this air cellular cushion might be paraplegic. In this case, the user might not have the sensations of the buttocks. Therefore, as described above, a nurse, for example, confirms the distance between near the ischia of the user's buttocks and the base member by fingers, so that an event that air cells collapse to the bottom is prevented.

The collapse amount of the air cell is increased depending on a change in the user's posture, and air leakage from air cells, air passages, and an air vent valve, for example. Thus, although air cells do not collapse to the bottom in the initial state, air cells sometimes collapse to the bottom after some time elapses. It is difficult for a user who is paraplegic with no sensations of the buttocks to become aware of air cells collapsing to the bottom by him/herself. In other words, air cells to collapse to the bottom often mainly support near the ischia and the coccyx in the buttocks. These air cells are provided around the center of the cushion. Thus, it is difficult to visually confirm whether these air cells collapse to the bottom.

As described above, it is difficult to visually confirm air cells collapsing to the bottom. Thus, a nurse or the like inserts fingers between the user's buttocks and the base member on a regular basis, so that the nurse or the like confirms the distance between the user's buttocks and the base member, and confirms whether air cells collapse to the bottom. Therefore, it takes time and effort for confirmation. It is difficult for the user him/herself to confirm whether air cells collapse to the bottom by this method.

There is also the case where a user's posture leans to the right or left because the user has a habit of sitting to lean to the right or left, for example. In this case, only the air cells supporting near any one of right and left ischia are likely to collapse to the bottom. In this case, supplying air to all the air cells by repeatedly compressing the rubber ball often results in filling excess air to air cells receiving less weight. Thus, the leaning of the user's posture is promoted.

In this case, the user's buttocks are temporarily moved upward to the positions at which the user's buttocks do not contact with air cells, and the user is then again seated on the cushion. Thus, air can be moved from the other air cells to the air cells collapsing to the bottom. This method does not promote the leaning of the user's posture. However, as described above, it is difficult to visually confirm air cells collapsing to the bottom. Therefore, it is also difficult to determine whether the leaning of the user's posture is a cause of the collapse of the air cells to the bottom. As a result, it is difficult to determine whether to supply air to air cells or to again let the user be seated on the cushion.

An object of the present disclosure is to provide an air cellular cushion that can effectively eliminate the collapse of air cells to the bottom.

First Embodiment

An air cellular cushion according to a first embodiment of the present disclosure will be described with reference to FIGS. 1 to 14. This air cellular cushion is placed on the seating surface of various chairs including a wheelchair and used.

Figure 2:
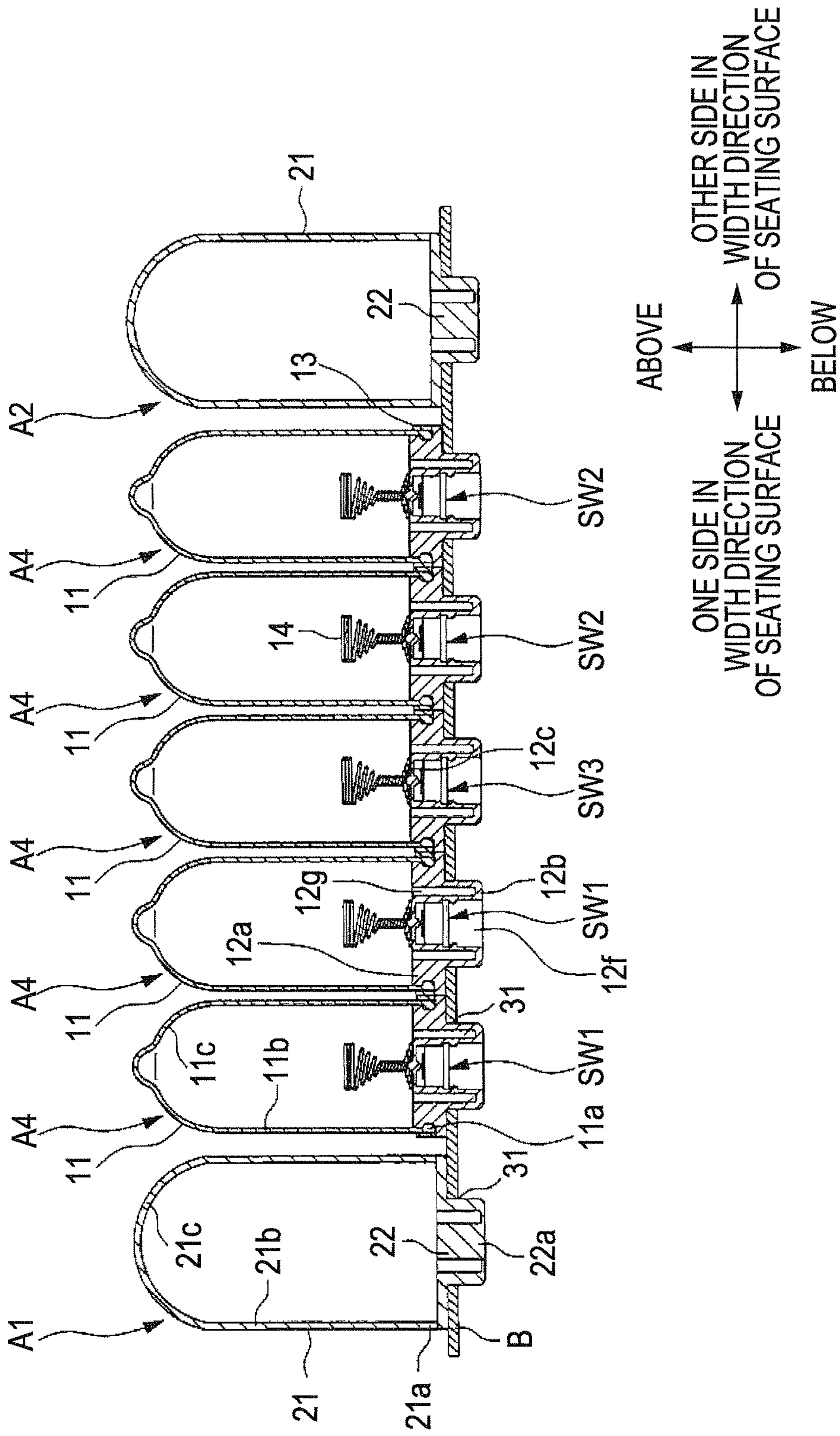
FIG. 2 is a cross sectional view taken along line P-P in FIG. 1.
Figure 3:
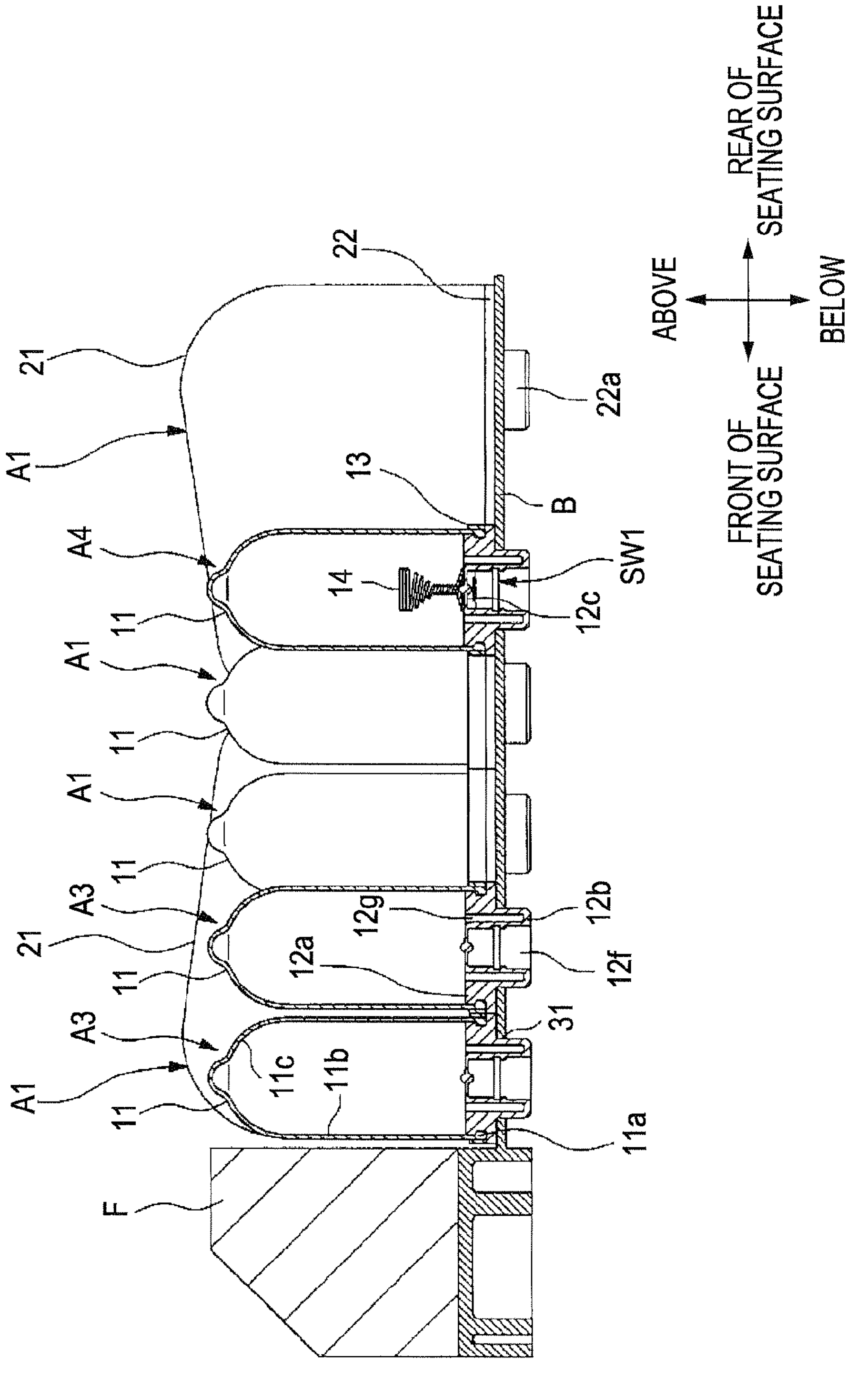
FIG. 3 is a cross sectional view taken along line Q-Q in FIG. 1.

As illustrated in FIGS. 1 to 3, this air cellular cushion has four air cell groups G1 to G4 (see FIG. 12), a front side support member F, and a flat support member B.

The first air cell group G1 (the air cell group on one side in the width direction) includes a plurality of air cells A1. The air cells A1 are provided near a first lateral side (the end on one side in the width direction) of a seating surface. The second air cell group G2 (the air cell group on the other side in the width direction) includes a plurality of air cells A2. The air cells A2 are provided near a second lateral side (the end on the other side in the width direction) of the seating surface. The third air cell group G3 (the air cell group on the front side) includes a plurality of air cells A3. The air cells A3 are provided near the front end portion (the front side of the center part in the width direction) of the seating surface. The fourth air cell group G4 (the air cell group on the rear side) includes a plurality of air cells A4. The air cells A4 are provided near the rear side (the rear side of the center part in the width direction) of the seating surface. The front side support member F is provided in front of the air cells A1 to A4 to extend in the width direction of the seating surface. The support member B supports the lower ends of the respective air cells A1 to A4 and the lower end of the front side support member F. In FIGS. 1, 2, and 3, the front-rear, width, and vertical directions of the seating surface are illustrated. The width direction of the seating surface and the width direction of the user are the same direction.

Figure 5:
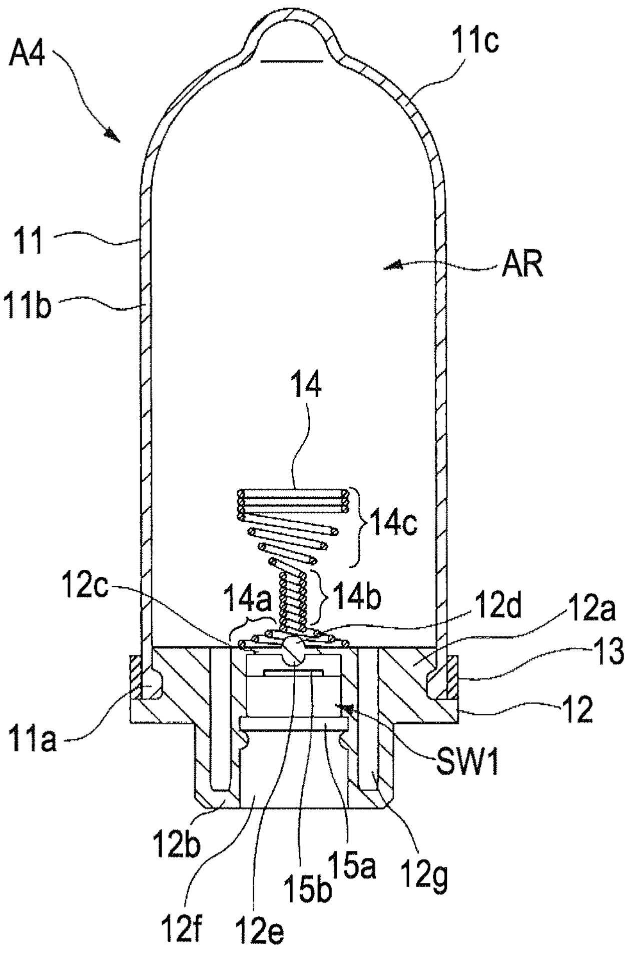
FIG. 5 is a side sectional view of an air cell.
Figure 6:
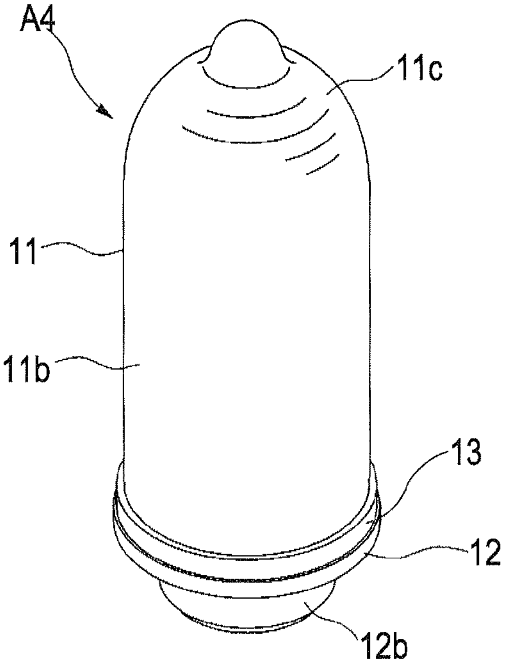
FIG. 6 is a perspective view of an air cell.

Two air cells A1 provided on the inner side in the width direction of the seating surface, two air cells A2 provided on the inner side in the width direction of the seating surface, and the air cells A3 and A4 have an air bag 11, a base member 12, and a ring-shaped holding member 13 (see FIGS. 5 and 6). The air bag 11 has an open lower end. An opening edge 11*a* of the air bag 11 is detachably mounted on the base member 12. The base member 12 retains the air bag 11 with the holding member 13.

The material of the air bag 11 is a flexible material such as rubber or plastic. The air bag 11 can be filled with air. The air bag 11 has a cylindrical portion 11*b* and an upper end portion 11*c*. The cylindrical portion 11*b* is a vertically extending cylindrical member with a circular radial cross section. The upper end portion 11*c* is formed so as to close the top end of the cylindrical portion 11*b*. The cylindrical portion 11*b* and the upper end portion 11*c* are formed of a thin film with a generally uniform thickness. The lower end of the cylindrical portion 11*b* is formed with the opening edge 11*a* of the air bag 11. As illustrated in FIG. 5, the opening edge 11*a* protrudes inwardly in the radial direction over the inner periphery of the cylindrical portion 11*b*.

The material of the base member 12 is rubber or plastic, for example. The base member 12 is formed in a disk shape. A top side protruding portion 12*a* protruding upward in a circular shape in the cross section is provided on the top surface of the base member 12. The top side protruding portion 12*a* has a tip end and a base end having a diameter smaller than that of the tip end. Thus, the outer periphery of the tip end of the top side protruding portion 12*a* protrudes outwardly in the radial direction over the outer periphery of the base end. Therefore, the top side protruding portion 12*a* is formed with a step along the outer periphery. The opening edge 11*a* of the air bag 11 is mounted on the top side protruding portion 12*a* by fitting into the step on the outer periphery of the top side protruding portion 12*a*. That is, the opening edge 11*a* engages with the tip end of the top side protruding portion 12*a* from below. The opening edge 11*a* of the air bag 11 is fit into the top side protruding portion 12*a*, and then the holding member 13 is mounted on the outer periphery of the opening edge 11*a*. Thus, the opening edge 11*a* is pressed against the outer periphery of the top side protruding portion 12*a*. Consequently, the opening edge 11*a* that is the lower end of the air bag 11 is vertically supported by the base member 12. The opening at the lower end of the air bag 11 is closed with the top end surface of the top side protruding portion 12*a*. Thus, the top end surface of the top side protruding portion 12*a* and the air bag 11 form an air chamber AR. An under side protruding portion 12*b* with a circular cross section protruding downward is provided on the under surface of the base member 12.

A thin film portion 12*c* is formed on the center part of the top end surface of the top side protruding portion 12*a* of the base member 12. An upper side protruding portion 12*d* protruding upward and a lower side protruding portion 12*e* protruding downward are provided on the center part of this thin film portion 12*c*. That is, the thin film portion 12*c* forms a part of the bottom surface of the air chamber AR. The thin film portion 12*c* is integrally formed with the base member 12. The thin film portion 12*c* is elastically deformable in the vertical direction. The upper and lower side protruding portions 12*d* and 12*e* have a nearly hemispherical shape. The upper side protruding portion 12*d* is provided below a middle portion 14*b* of a coil spring 14, described later.

Figure 4:
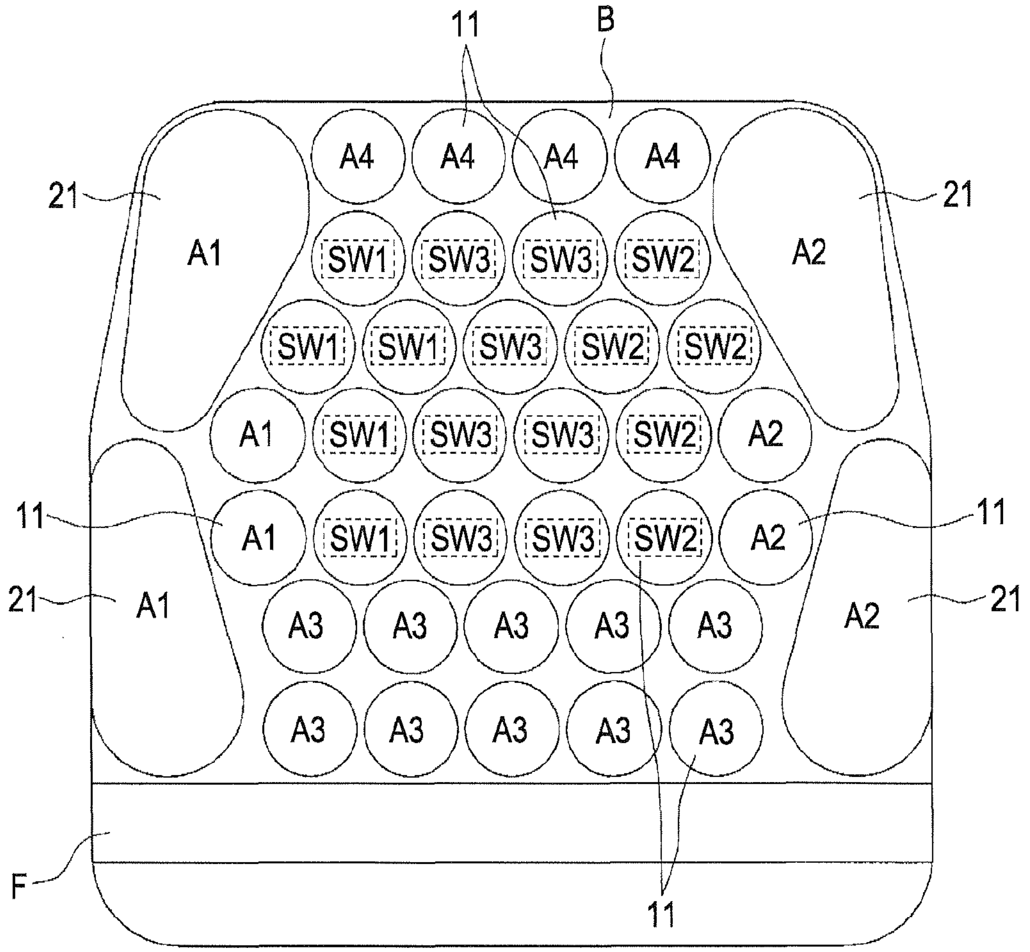
FIG. 4 is a plan view of the air cellular cushion illustrative of the arrangement of switches.

A hole 12*f* having a rectangular cross section is provided below the thin film portion 12*c* in the base member 12. The hole 12*f* is formed so as to vertically extend. The hole 12*f* has an opening in the lower end surface of the under side protruding portion 12*b*. As illustrated in FIG. 4, switches SW1, SW2, and SW3 are mounted inside the hole 12*f* of the base member 12 in a part of the air cells A3 and A4. These switches are a sensor that detects the deformation of the thin film portion 12*c* in the vertical direction. More specifically, the first switch SW1 (the switch on one side in the width direction) is mounted on five air cells A3 and A4 provided near the first lateral side of the seating surface. The second switch SW2 (the switch on the other side in the width direction) is mounted on five air cells A3 and A4 provided near the second lateral side of the seating surface. The third switch SW3 (the switch on the center in the width direction) is mounted on seven air cells A3 and A4 provided near the center part in the width direction of the seating surface.

Figure 10:
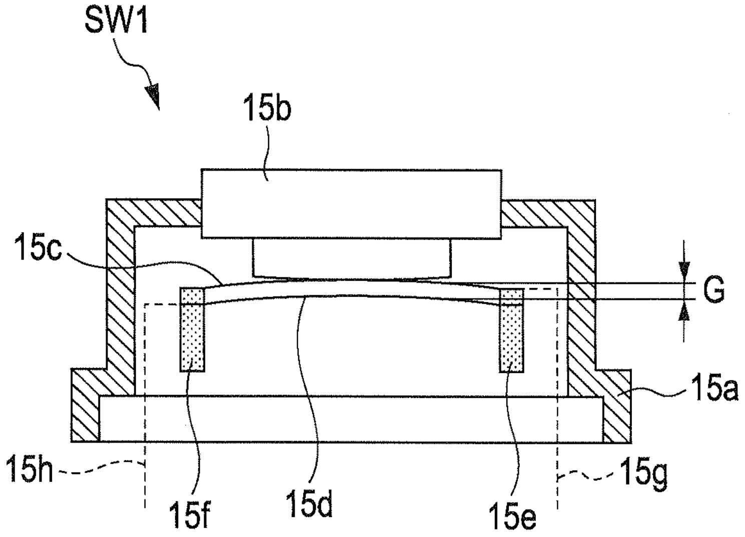
FIG. 10 is a side sectional view of a switch.
Figure 11:
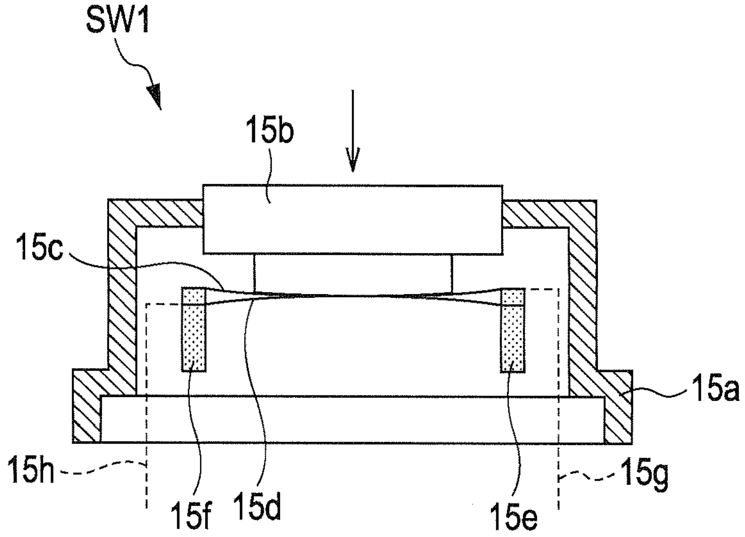
FIG. 11 is a side sectional view of a switch.

The switches SW1, SW2, and SW3 have a main body 15*a* formed to have a hollow, a button member 15*b*, a first contact member 15*c*, and a second contact member 15*d* (see FIG. 10). The button member 15*b* is vertically movably provided on the top end surface of the main body 15*a*. The first contact member 15*c* is provided below the button member 15*b* inside the main body 15*a*. The second contact member 15*d* is provided below the first contact member 15*c* inside the main body 15*a*. The main body 15*a* is fit into the inside of the hole 12*f* in the base member 12. That is, each of the switches SW1, SW2, and SW3 is detachably placed in the corresponding hole 12*f* in the base member 12. The button member 15*b* is provided below the lower side protruding portion 12*e* of the thin film portion 12*c*. The switches SW1, SW2, and SW3 are mounted on the base member 12 such that a small gap is provided between the lower side protruding portion 12*e* and the button member 15*b* (see FIG. 5). It is noted that the lower side protruding portion 12*e* may be in contact with the button member 15*b*.

The coil spring 14 made of metal is placed on the top end surface of the top side protruding portion 12*a* of the base member 12 having the switches SW1, SW2, and SW3 mounted thereon. Thus, the coil spring 14 is provided inside the air chamber AR. The axial direction of the coil spring 14 is matched with the vertical direction. The coil spring 14 has a lower portion 14*a*, the middle portion 14*b*, and an upper portion 14*c*. The coil diameter of the lower portion 14*a* is gradually reduced from the lower end toward the top end. The lower end of the lower portion 14*a* is fixed to a portion other than the thin film portion 12*c* in the top end surface of the top side protruding portion 12*a* of the base member 12 by bonding or fitting. The middle portion 14*b* is formed in such a way that the middle portion 14*b* extends upward from the top end of the lower portion 14*a* and has a uniform coil diameter. The upper portion 14*c* is formed in such a way that the upper portion 14*c* extends upward from the top end of the middle portion 14*b*. The coil diameter of the upper portion 14*c* is gradually increased from the lower end toward the top end. That is, the middle portion 14*b* and the upper portion 14*c* are provided above the thin film portion 12*c*. The middle portion 14*b* and the upper portion 14*c* are vertically movably supported above the thin film portion 12*c* by the lower portion 14*a*. The lower portion 14*a* biases the middle portion 14*b* and the upper portion 14*c*, which are vertically moved, to predetermined positions before moved. A predetermined gap is provided between the lower end of the middle portion 14*b* and the upper side protruding portion 12*d* of the thin film portion 12*c*. It is noted that the lower end of the middle portion 14*b* may be in contact with the upper side protruding portion 12*d* of the thin film portion 12*c*.

The switches SW1, SW2, and SW3 can detect the downward deformation of the thin film portion 12*c*. That is, the button member 15*b* of the switches SW1, SW2, and SW3 is provided below the lower side protruding portion 12*e* of the thin film portion 12*c*. When the button member 15*b* is pressed downward, the first contact member 15*c* is elastically deformed so as to move downward by a predetermined distance G. Thus, the first contact member 15*c* and the second contact member 15*d* come into contact with each other and electricity is conducted between a first electric wire 15*g* and a second electric wire 15*h* (see FIG. 11).

Two air cells A1 provided on the outer side in the width direction of the seating surface and two air cells A2 provided on the outer side in the width direction of the seating surface have an air bag 21 and a base member 22. The lower end of the air bag 21 is opened. An opening edge 21*a* of the air bag 21 is mounted on the base member 22 by bonding.

The material of the air bag 21 is a flexible material such as rubber or plastic. The air bag 21 can be filled with air. The air bag 21 has a vertically extending cylindrical portion and an upper end portion 21*c*. The upper end portion 21*c* is formed so as to close the top end of the cylindrical portion 21*b*. The lower end of the cylindrical portion 21*b* forms the opening edge 21*a* of the air bag 21. The cylindrical portion 21*b* and the upper end portion 21*c* are formed of a thin film with a generally uniform thickness. The thickness of this thin film is a little thicker than the thickness of the air bag 11. The air bag 21 has an area three times or more the area of the air bag 11 when seen in plane. The dimensions of the air bag 21 in the front-rear direction of the seating surface are greater than the dimensions in the width direction of the seating surface. That is, in the case where an air pressure in the air bag 11 and an air pressure in the air bag 21 are made equal, stiffness in the front-rear direction and stiffness in the width direction of the seating surface in the air bag 21 are higher than stiffness of the air bag 11.

The material of the base member 22 is rubber or plastic, for example. The base member 22 is formed in a plate shape. A plurality of under side protruding portions 22*a* protruding downward are provided on the under surface of the base member 22.

The material of the front side support member F is a spongiform member such as urethane foam. A slope is formed on the front end of the front side support member F. The front side support member F supports user's thighs.

Figure 13:
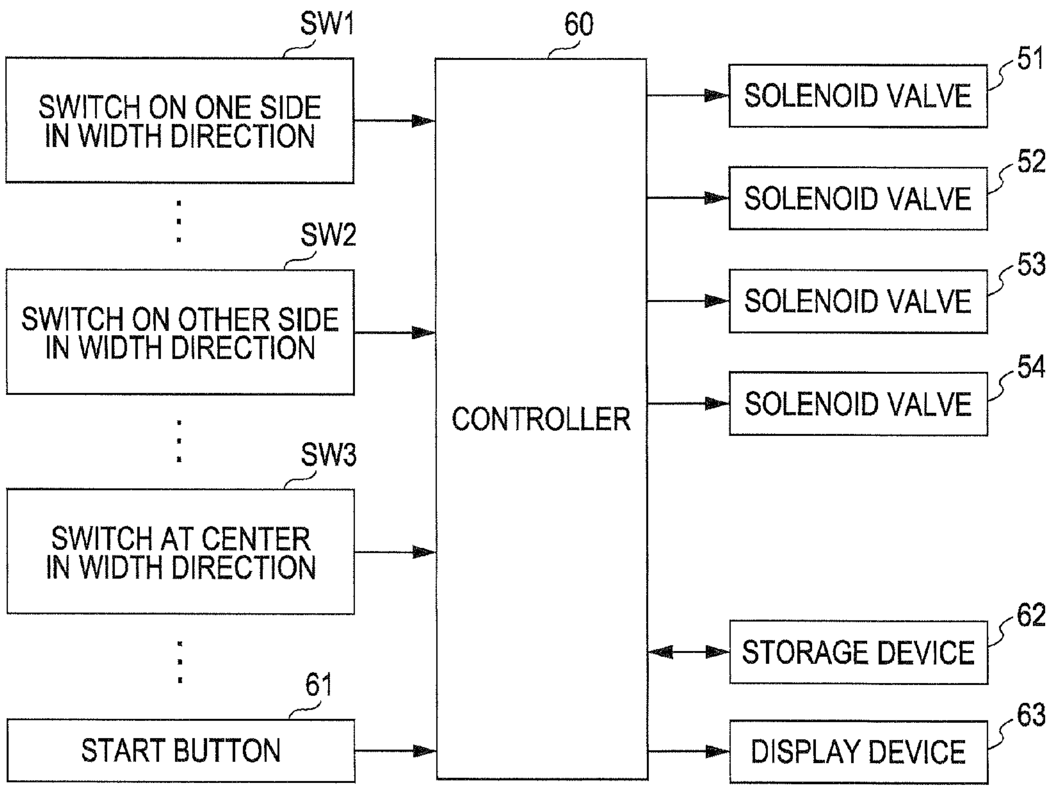
FIG. 13 is a block diagram of the air cellular cushion.

The material of the support member B is rubber or plastic, for example. The area of the support member B is nearly equal to the area of the seating surface. The thickness of the front end of the support member B is greater than the thickness of the other portions. A controller (control unit) 60, a start button 61, a storage device 62, a display device (indicator) 63, solenoid valves (on-off valves) 51 to 54, and the like, illustrated in a block diagram of FIG. 13, are provided in this front end side portion. The under surface of the front side support member F is mounted on the top surface of the front end side portion with a large thickness by bonding.

The support member B is provided with a plurality of through holes 31 vertically extending. The under side protruding portions 12*b* and 22*a* of the base members 12 and 22 of the air cells A1, A2, A3, and A4 are each inserted into the through hole 31 from above and fit into the through hole 31. Thus, the lower end of the air cells A1, A2, A3, and A4 is detachably supported by the support member B. The under side protruding portions 12*b* and 22*a* of the base members 12 and 22 of the air cells A1, A2, A3, and A4 protrude from the lower end surface of the support member B.

Therefore, the lower end of the air cells A1, A2, A3, and A4 is supported by the support member B. The air bags 11 and 21 of the air cells A1, A2, A3, and A4 are provided so as to extend upward from the top surface of the support member B.

Figure 7:
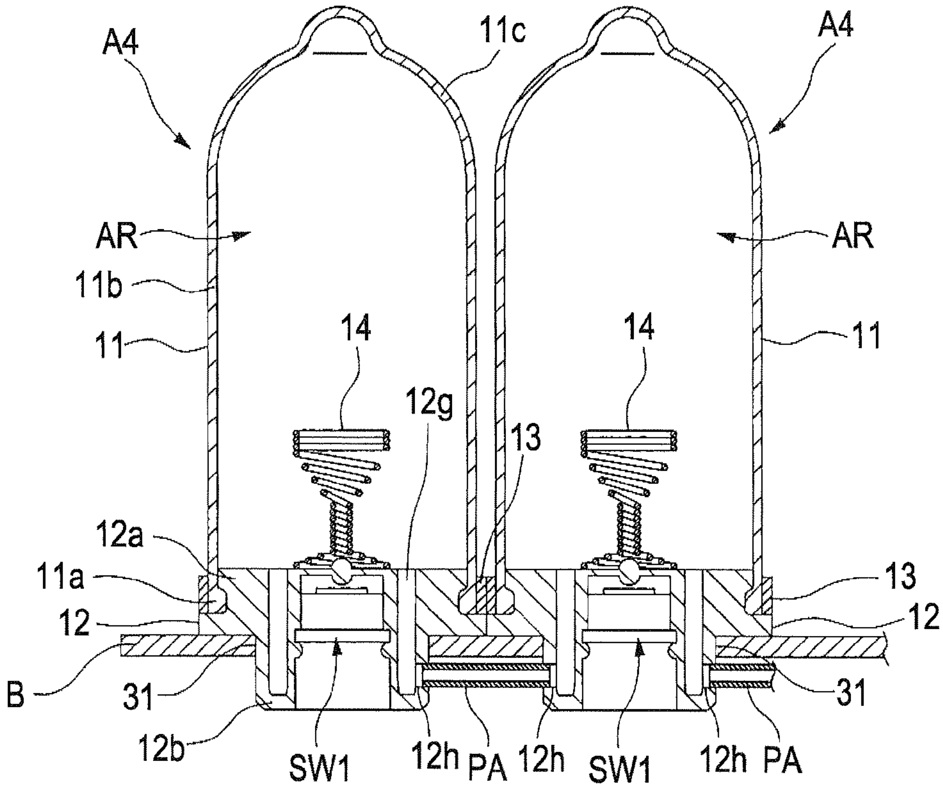
FIG. 7 is a side sectional view of the main part of the air cellular cushion.
Figure 8:
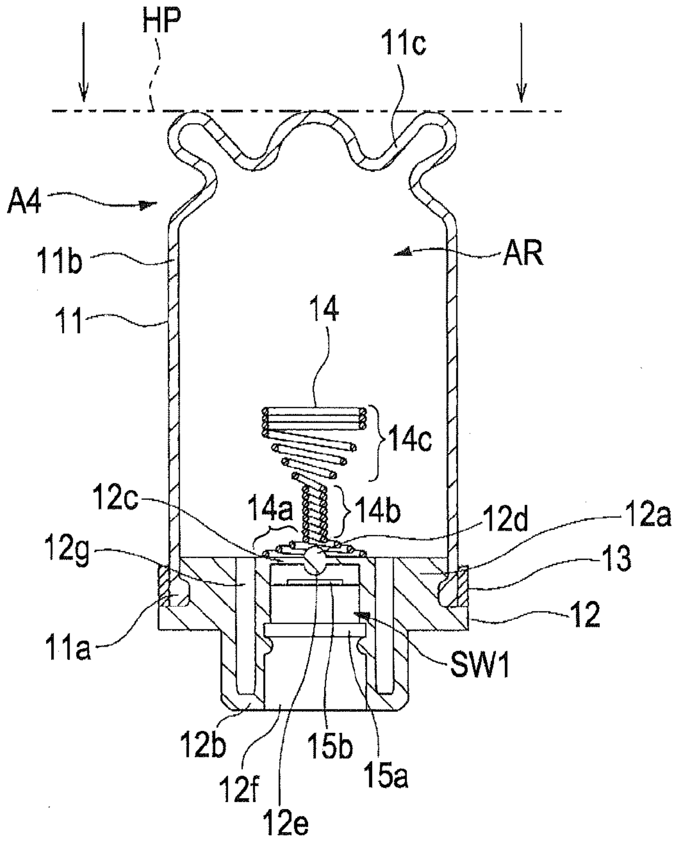
FIG. 8 is a side sectional view of an air cell illustrative of a state in which an air bag is collapsing.
Figure 9:
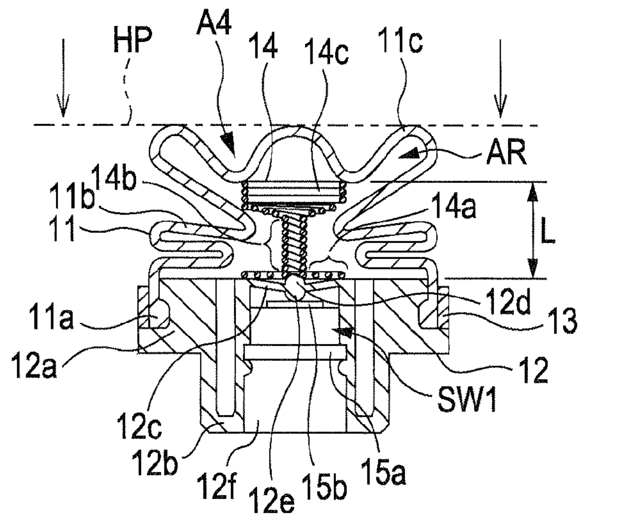
FIG. 9 is a side sectional view of an air cell illustrative of a state in which an air bag is collapsing.

After the air cells A1, A2, A3, and A4 are supported by the support member B, an air passage is provided in such a way that the insides of the air cells A4 communicate with each other as illustrated in FIG. 7. More specifically, this air passage has a plurality of vent holes 12*g*, a transverse hole 12*h*, and a communicating pipe PA. The vent holes 12*g* are provided so as to vertically extend through the base member 12 of the air cells A4. The transverse hole 12*h* is provided so as to extend from the outer periphery of the under side protruding portion 12*b* of the base member 12 to the vent hole 12*g*. The communicating pipe PA causes the transverse holes 12*h* of the base member 12 to communicate with each other. The similar air passages cause the insides of the air cells A1, A2, and A3 to communicate with each other.

Figure 12:
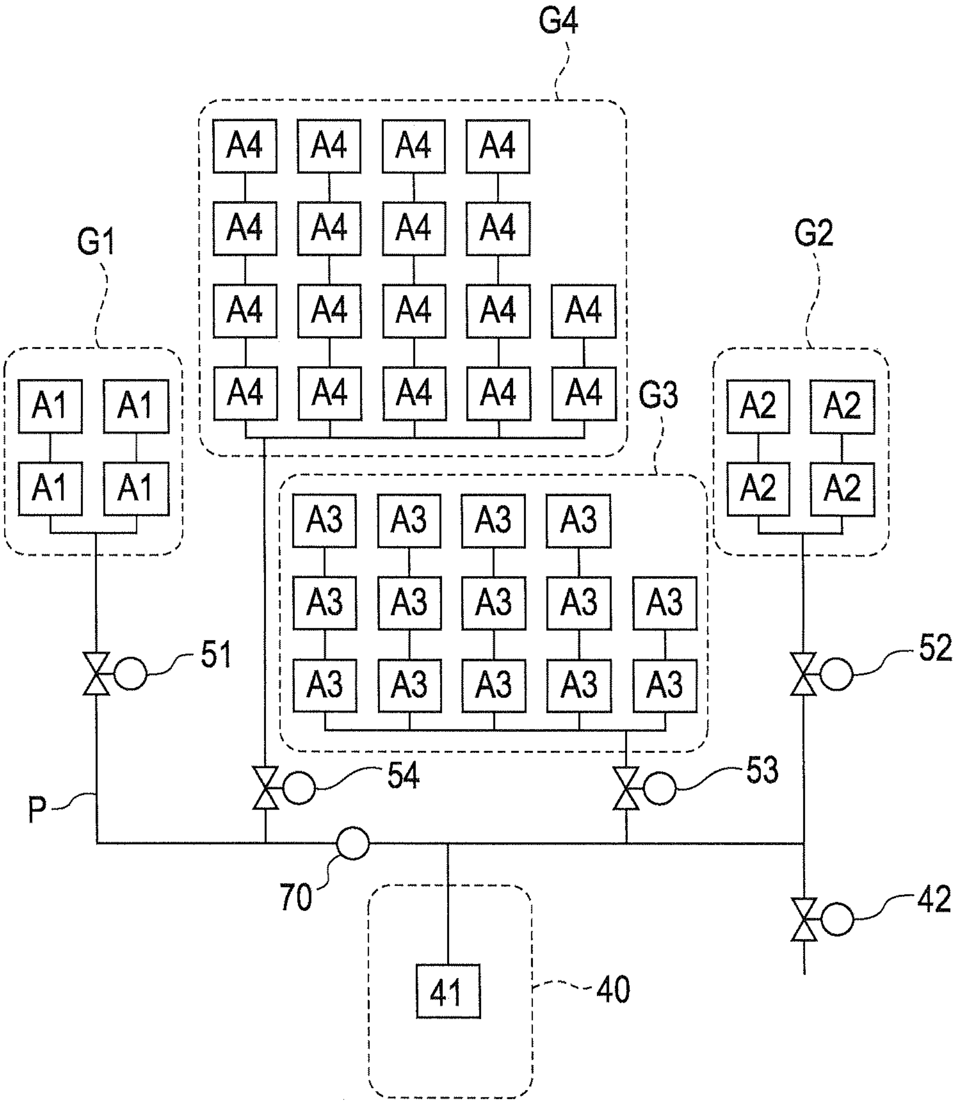
FIG. 12 is a schematic diagram illustrative of the pipe arrangement of the air cellular cushion.

As illustrated in FIG. 12, the air cells A1 to A4 are connected to a manual type air pump 40 through an air passage P. The air pump 40 has a flexible hollow rubber ball 41. Air is supplied to the air cells A1 to A4 by repeatedly compressing the rubber ball 41. As illustrated in FIG. 12, the air passage P can supply air from the air pump 40 to the individual air cell groups G1 to G4. The air passage P is provided with solenoid valves 51, 52, 53, and 54. These solenoid valves 51, 52, 53, and 54 switch the open and close states of the air passages extending from the air pump 40 to the air cell groups G1 to G4. The air passage P is further provided with an air vent valve 42 that evacuates air inside the air passage P. The air vent valve 42 is operatively provided on a portion of the support member B corresponding to the front end of the second lateral side of the seating surface (the side on the other side in the width direction), for example. It is noted that it is also possible to provide the air vent valve 42 on the air pump 40.

The solenoid valves 51, 52, 53, and 54 are connected to the controller 60 having a known microcomputer. The controller 60 is also connected to the switches SW1, SW2, and SW3. The controller 60 is connected to the start button 61, a known storage device 62, and the display device 63. The display device 63 has a known buzzer that can emit continuous sounds and intermittent sounds.

The air cellular cushion configured as described above is placed on the seating surface of a wheelchair, for example and used. In this case, first, air is filled in the air cells A1, A2, A3, and A4, before the user sits on the cushion. Here, air is filled in the air cells A1, A2, A3, and A4 such that none of the air cells A1, A2, A3, and A4 collapses to the bottom when the user sits on the cushion. It is noted that the state in which air cells collapse to the bottom is a state in which the collapse amounts of the air cells A1, A2, A3, and A4 become a predetermined amount or more and the air bag 11 cannot softly support user's buttocks HP. The event that the collapse amounts of the air cells A1, A2, A3, and A4 become a predetermined amount or more means an event, for example, that the distance between the upper end portion 11*c* of the air bag 11 of the air cells A1, A2, A3, and A4 and the top end surface of the base member 12 is made smaller than a predetermined distance L (see FIG. 9).

Here, the switches SW1, SW2, and SW3 provided on the air cells A3 and A4 can detect that the corresponding air cells A3 and A4 collapse to the bottom (the distance between the upper end portion 11*c* of the air bag 11 and the top end surface of the base member 12 is made smaller than the predetermined distance L).

Figure 14:
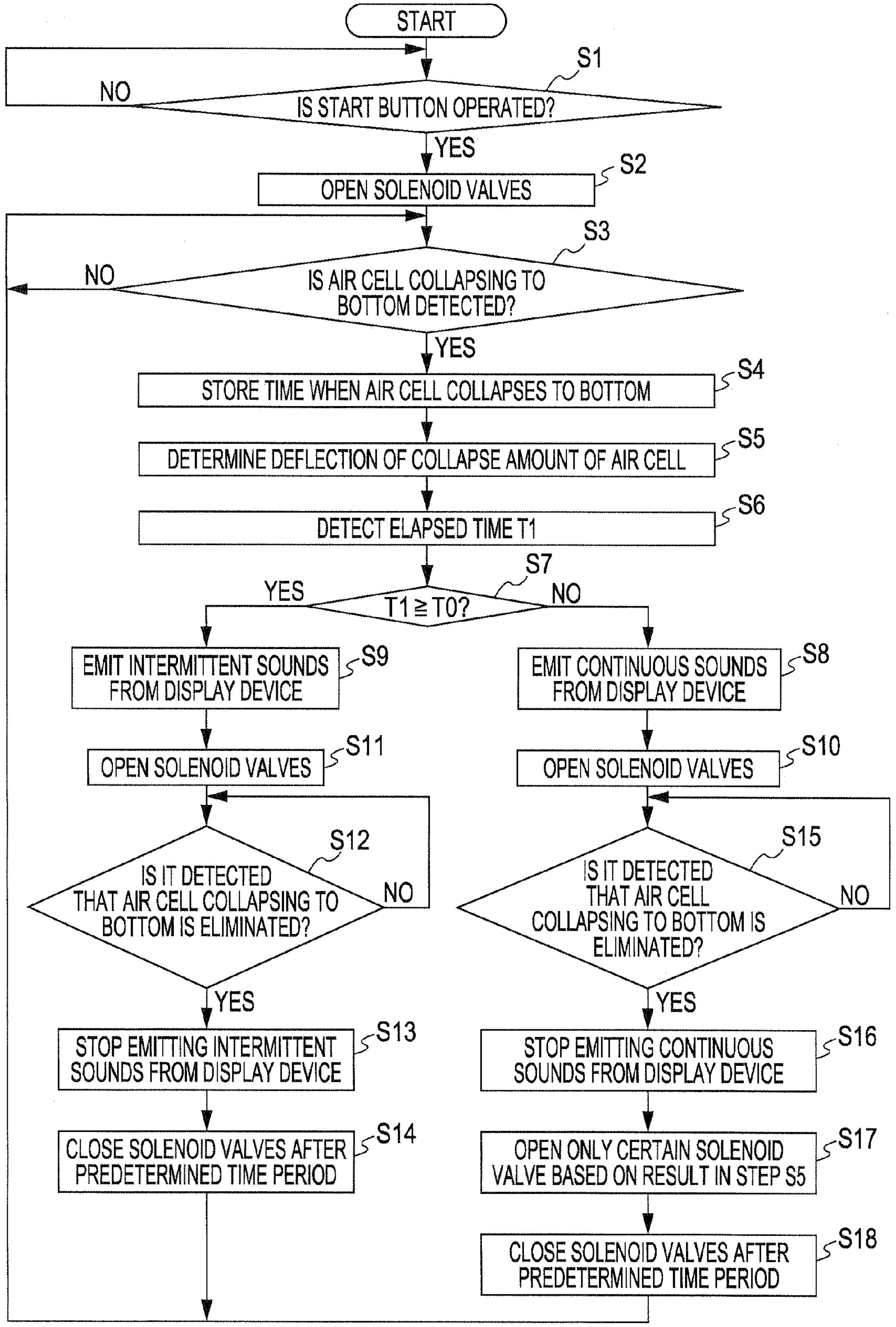
FIG. 14 is a flowchart showing the operation of a controller.

After the user sits on the cushion, the controller 60 performs the following control (see FIG. 14).

First, when the user sitting on the cushion, the nurse, or the like operates the start button 61 (S1), the controller 60 opens the solenoid valves 51, 52, 53, and 54 (S2). Thus, the insides of the air cells A1, A2, A3, and A4 communicate with each other, and pressures inside the air cells A1, A2, A3, and A4 are made nearly equal to each other. The user, the nurse, or the like can open the air vent valve 42 in this state. Therefore, it is possible to gradually reduce air inside the air cells A1, A2, A3, and A4.

Subsequently, when one or more of the switches SW1, SW2, and SW3 detect that the thin film portion 12*c* is continuously positioned below for a predetermined time period or more (five seconds or more, for example), that is, one or more of switches detect that the corresponding air cells collapse to the bottom (S3), the controller 60 stores the detected time in the storage device 62 (S4). The controller 60 determines the deflection of the collapse amounts of the air cells A1, A2, A3, and A4 in the width direction of the seating surface based on the position of the switches (sensors) detecting that the air cells collapse to the bottom (S5). For example, in the case where only the first switch SW1 detects that an air cell collapses to the bottom, or in the case where the first switch SW1 and the third switch SW3 detect that air cells collapse to the bottom, the controller 60 determines that the collapse amounts of the air cells A1, A2, A3, and A4 deflect to one side in the width direction of the seating surface. In the case where only the third switch SW3 detects that an air cell collapses to the bottom, or in the case where two first switches SW1 and two second switches SW2 detect that air cells collapse to the bottom, the controller 60 determines that the collapse amounts of the air cells A1, A2, A3, and A4 do not deflect to the width direction of the seating surface. It is noted that determination methods can be appropriately established according to the arrangement of air cells or the arrangement of switches.

The controller 60 also functions as an elapsed time measuring device and a parameter measuring unit. That is, in the case where one or more of switches previously detect that air cells collapse to the bottom, this detected time (the previous detected time) is stored in Step S4. The controller 60 measures an elapsed time T1 from this previous detected time to the detected time (the detected time this time) at which it is detected that air cells collapse to the bottom in Step S3 (S6). This elapsed time T1 is a parameter indicating the collapse state of an air cell collapsing to the bottom. The controller 60 then compares the elapsed time T1 with a predetermined time period T0 (S7). In the case where the elapsed time T1 is shorter than the predetermined time period T0, the controller 60 controls the display device 63 to emit continuous sounds (S8). In the case where the elapsed time T1 is the predetermined time period T0 or more, the controller 60 controls the display device 63 to emit intermittent sounds (S9). In any case, the controller 60 keeps the solenoid valves 51, 52, 53, and 54 open (S10 and S11).

Here, for example, there is also the case where the user has a habit of sitting to lean to one or the other side in the width direction of the seating surface and only the air cells supporting near the ischium on the leaning side collapse by a predetermined amount or more (the air cells collapse to the bottom). In this case, the elapsed time T1 tends to be longer. On the other hand, in the case where a micro air leakage occurs in the air cell, the air passage, the air pump 40, or the like, the elapsed time T1 tends to be shorter. It is noted that it is unnecessary to consider the elapsed time T1 in the operation for the initial settings in which air inside the air cells A1, A2, A3, and A4 is evacuated through the air vent valve 42 after the user sits on the cushion.

In the operation for the initial settings, the initial air quantity is adjusted by evacuating air inside the air cells A1, A2, A3, and A4 through the air vent valve 42 after the user sits on the cushion. Thus, any of Steps S8 and S9 may be performed after this operation. However, for example, in the case where intermittent sounds are emitted in Step S9, the user, the nurse, or the like can know the collapse of air cells to the bottom. Therefore, the user, the nurse, or the like can eliminate the collapse of the air cells to the bottom by closing the air vent valve 42 and supplying air to the air cells A1, A2, A3, and A4 using the air pump 40. When it is detected that the collapse of the air cells to the bottom is eliminated by supplying air (S12), the controller 60 stops the emission of intermittent sounds by the display device 63 (S13). The controller 60 then closes the solenoid valves 51, 52, 53, and 54 after a predetermined time period since the collapse of the air cells to the bottom is eliminated in Step S12 (after ten seconds, for example) (S14). As a result, the user, the nurse, or the like can know that the collapse of the air cells to the bottom is eliminated. Air can be supplied to the air cells A1, A2, A3, and A4 only for a predetermined time period since the collapse of the air cells to the bottom is eliminated. Thus, it is possible to make the air quantity inside the air cells A1, A2, A3, and A4 as small as possible while the air cells A1, A2, A3, and A4 are prevented from collapsing to the bottom. Therefore, it is possible to effectively distribute the pressure applied to the user's buttocks.

After Step S14 is finished, the controller 60 again starts control from Step S3.

That is, after the initial settings are finished, when one or more of switches detect that the corresponding air cells collapse to the bottom (S3), the controller 60 stores the detected time in the storage device 62 (S4). After that, the controller 60 determines the deflection of the collapse amounts of the air cells A1, A2, A3, and A4 in the width direction of the seating surface (S5). The controller 60 measures an elapsed time T1 (S6), and compares this elapsed time T1 with a predetermined time period T0 (S7). In the case where the elapsed time T1 is shorter than the predetermined time period T0, the controller 60 controls the display device 63 to emit continuous sounds (S8). On the other hand, in the case where the elapsed time T1 is a predetermined time period or more, the controller 60 controls the display device 63 to emit intermittent sounds (S9). In any case of performing Step S8 or S9, the controller 60 opens the solenoid valves 51, 52, 53, and 54 (S10 and S11).

This step is not a step in which the initial settings are established as described above. Thus, in the case where the display device 63 emits continuous sounds in Step S8, it is found that a micro air leakage is highly likely to occur from the air cells A1, A2, A3, and A4, the air passage P, or the like. On the other hand, in the case where the display device 63 emits intermittent sounds in Step S9, it is found that only the collapse amounts of the air cells supporting near the ischium on the leaning side are highly likely a predetermined amount or more because of the user's habit of sitting to lean.

As a result, in the case where the display device 63 emits intermittent sounds in Step S9, the user or the nurse temporarily moves the user's buttocks upward to the positions at which the user's buttocks do not contact with the air cells A1, A2, A3, and A4, and the user is then again seated on the cushion. At this time, the solenoid valves 51, 52, 53, and 54 are opened in Step S11. Thus, air is moved from the other air cells to the air cells collapsing to the bottom. Therefore, it is possible to eliminate the collapse of the air cells to the bottom. That is, the user or the nurse takes appropriate steps based on the indication state of the display device 63, so that it is possible to effectively eliminate the collapse of the air cells to the bottom caused by the user's posture.

In the case where the display device 63 emits continuous sounds in Step S8, the user, the nurse, or the like can know that air cells collapse to the bottom. Since the solenoid valves 51, 52, 53, and 54 are opened in Step S10, the user, the nurse, or the like can supply air to the air cells A1, A2, A3, and A4 using the air pump 40. Thus, it is possible to eliminate the collapse of the air cells to the bottom. When it is detected that the collapse of the air cells to the bottom is eliminated by supplying air (S15), the controller 60 causes the display device 63 to stop emitting continuous sounds (S16). Therefore, the user, the nurse, or the like can know that the collapse of the air cells to the bottom is eliminated by supplying air.

In the case where it is determined in Step S5 that the collapse amounts of the air cells A1, A2, A3, and A4 deflect to one side in the width direction of the seating surface, for example, the controller 60 opens only the solenoid valve 51 for the first air cell group G1, whereas the controller 60 closes the other solenoid valves 52, 53 and 54 (S17). After a predetermined time period (ten seconds, for example) elapses from Step S17, the controller 60 closes the solenoid valves 51, 52, 53, and 54 (S18). According to the operation in Step S17, air is supplied from the air pump 40 only to the air cells with a large collapse amount in the first air cell group G1. Thus, it is possible to supply much air to the air cells with a large collapse amount (the air cells corresponding to the leaning of the user) by supplying air from the air pump 40. Therefore, it is possible to hardly cause the user's posture to lean. That is, it is possible to effectively eliminate the collapse of air cells to the bottom caused by the user's posture.

On the other hand, in the case where it is determined in Step S5 that the collapse amounts of the air cells A1, A2, A3, and A4 do not deflect to any sides in the width direction of the seating surface, the controller 60 opens only the solenoid valves 51 and 52 for the first air cell group G1 and the second air cell group G2, or opens all the solenoid valves 51, 52, 53, and 54 (S17). After that, the controller 60 closes the solenoid valves 51, 52, 53, and 54 after a predetermined time period elapses from Step S17 (S18). According to the operations in Steps S17 and S18, it is possible to make the air quantity inside the air cells A1, A2, A3, and A4 as small as possible while the air cells A1, A2, A3, and A4 are prevented from collapsing to the bottom.

As described above, according to the air cellular cushion of the first embodiment, it is possible to effectively eliminate the collapse of air cells to the bottom. Thus, it is possible to favorably prevent the development of decubitus ulcers in the user.

It is noted that the first embodiment uses the display device 63 that emits two types of sounds, continuous sounds and intermittent sounds. Alternatively, however, it is also possible to use, as the display device 63, a device that emits a plurality of types of different sounds. It is also possible to use a device that displays a plurality of types of different lights as the display device 63. It is also possible to use a device that displays a plurality of types of different images as the display device 63.

In the flowchart of FIG. 14, the elapsed time T1 is measured since the time at which an air cell previously collapses by a predetermined amount or more (S6) when the switches SW1 to SW3 detect that an air cell collapses by a predetermined amount or more (S3). In Steps S7 to S9, the indication of the display device 63 is changed according to the duration of the elapsed time T1. On the contrary, as illustrated in FIG. 12, a pressure sensor (parameter measuring unit) 70 that measures air pressures may be provided in the air passage P. In this case, the controller 60 also functions as a pressure change rate measuring device. That is, in Step S6, the controller 60 measures a rate of change in pressure which is determined by the pressure sensor 70. This pressure change rate is a parameter indicating the collapse state of an air cell collapsing to the bottom. In the case where the pressure change rate is faster than a predetermined rate (as in S7), the controller 60 controls the display device 63 to emit continuous sounds (as in S8). On the other hand, in the case where the pressure change rate is a predetermined rate or less (as in S7), the controller 60 controls the display device 63 to emit intermittent sounds (as in S8). Thus, it is also possible to attain the effects and advantages similar to those in the description above. It is noted that the aforementioned pressure sensor 70 may be provided inside a single air cell, not in the air passage P.

Figure 15:
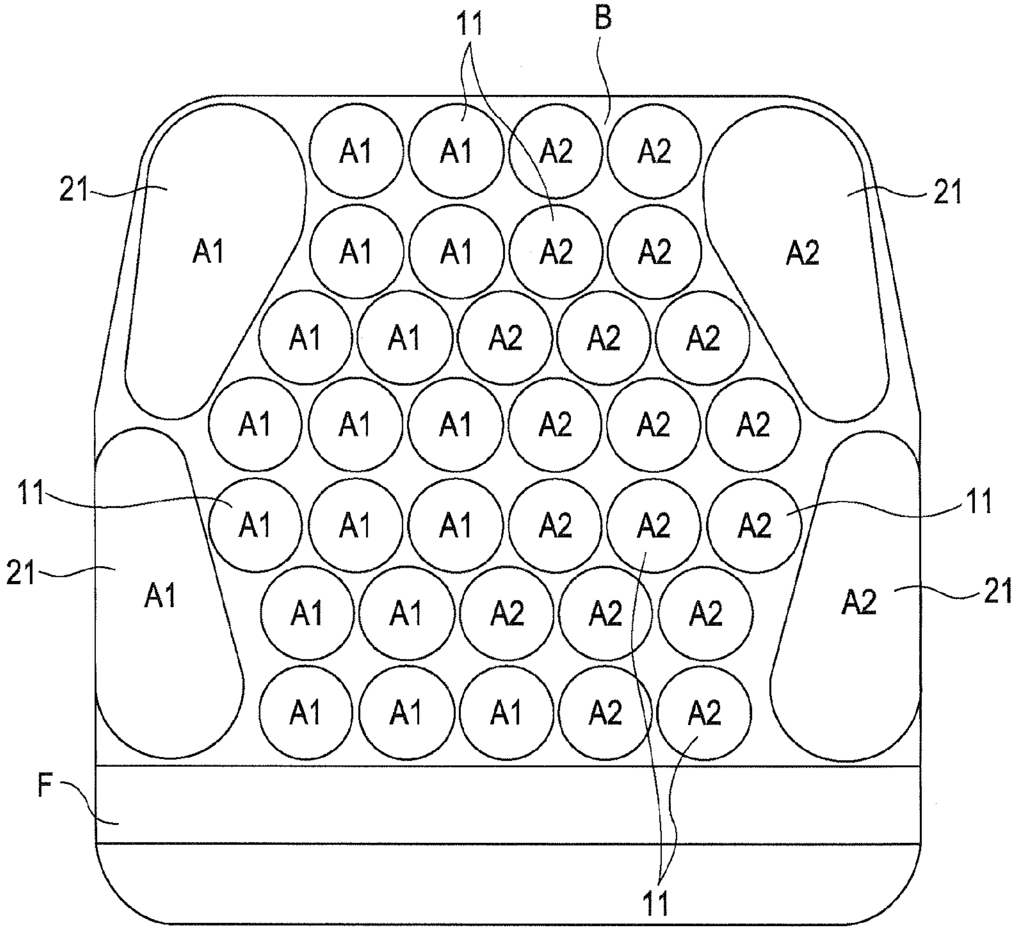
FIG. 15 is a plan view of an air cellular cushion showing a modification of the first embodiment.

As illustrated in FIG. 1, the air cellular cushion according to the first embodiment includes the first air cell group G1 having the plurality of air cells A1, the second air cell group G2 having the plurality of air cells A2, the third air cell group G3 having the plurality of air cells A3, and the fourth air cell group G4 having the plurality of air cells A4. Alternatively, however, it is also possible that the air cell groups provided in the air cellular cushion include only the first air cell group G1 having the plurality of air cells A1 and the second air cell group G2 having the plurality of air cells A2 as illustrated in FIG. 15. Also in this case, for example, it is possible to make the user's posture difficult to lean by supplying air only to the first air cell group G1, the user having a habit of leaning to the first air cell group G1 side. Thus, it is possible to attain the effects and advantages similar to those in the description above.

In the first embodiment, it is detected that the air cells A3 and A4 collapse to the bottom (the distance between the upper end portion 11*c* of the air bag 11 and the top end surface of the base member 12 is smaller than the predetermined distance L) using the thin film portion 12*c*, the coil spring 14, and the switches SW1, SW2, and SW3. Alternatively, however, it is also possible to provide a proximity sensor on the under surface of the upper end portion 11*c* of the air bag 11, for example. It is also possible to detect that the air cells A3 and A4 collapse to the bottom using the proximity sensor. It is also possible to detect that the air cells A3 and A4 collapse to the bottom using other known configurations.

It is also possible to use an impedance value in order to detect the collapse of air cells to the bottom. In this configuration, a metal thin film provided on the upper end portion 11*c* of the air bag 11 and an impedance varying element provided on the top end surface of the base member 12 are used, for example. The controller 60 measures the collapse amounts of the air cells A3 and A4 (the distance between the top end of the air bag 11 and the top end surface of the base member 12) based on the impedance value of the impedance varying element.

In the first embodiment, the base members 12 and 22 are detachably supported by the flat support member B. However, it is also possible to integrally form the base members 12 and 22 with the support member B.

In the first embodiment, the switches SW1, SW2, and SW3 provided below the thin film portion 12*c* detect the deformation of the thin film portion 12*c*. Alternatively, however, it is also possible to provide a known proximity sensor below the thin film portion 12*c*. In this case, this proximity sensor detects the deformation of the thin film portion 12*c*. It is also possible to provide a known photoelectric sensor below the thin film portion 12*c*. In this case, this photoelectric sensor detects the deformation of the thin film portion 12*c*.

In the first embodiment, the coil spring 14 is provided inside the air chamber AR. However, for example, it is also possible to provide a vertically elastically deformable rubber member, instead of the coil spring 14.

Second Embodiment

Figure 16:
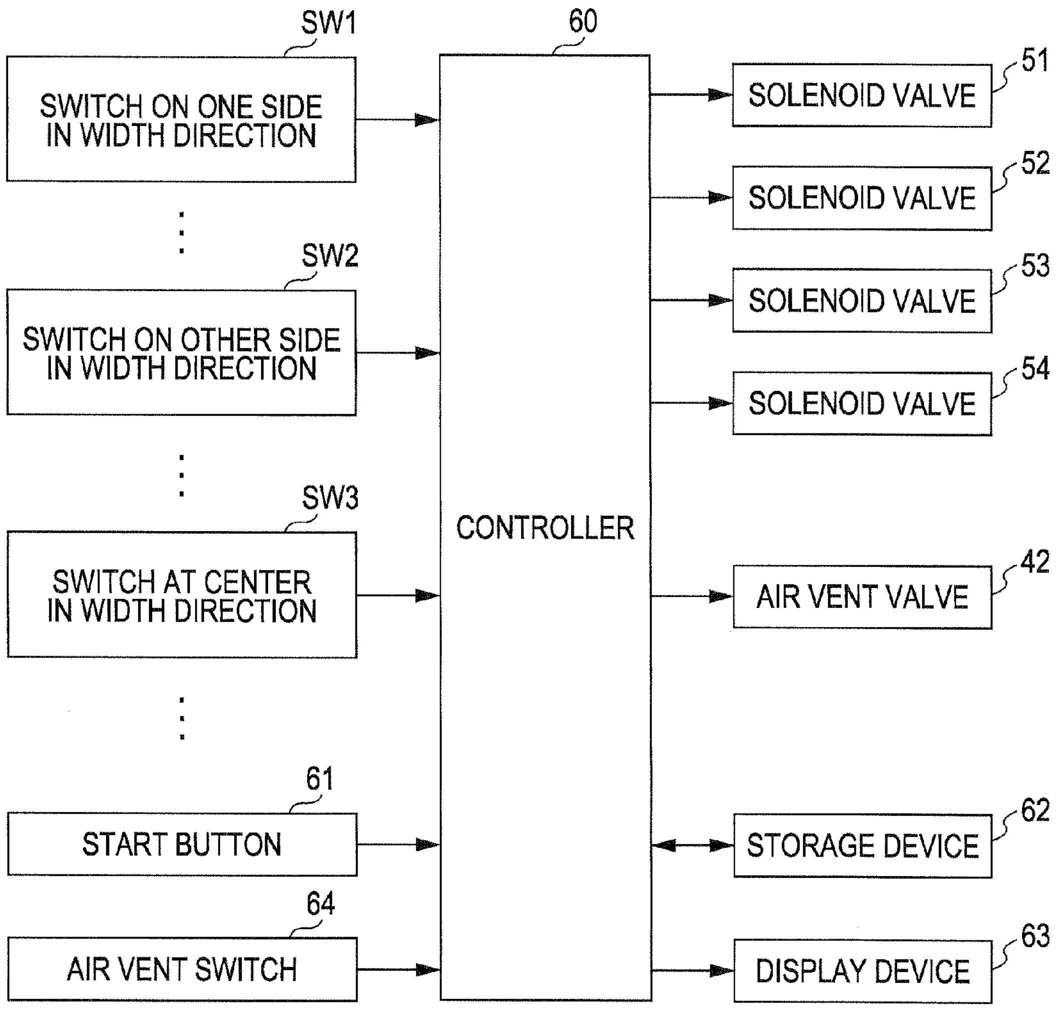
FIG. 16 is a block diagram of an air cellular cushion according to a second embodiment.
Figure 17:
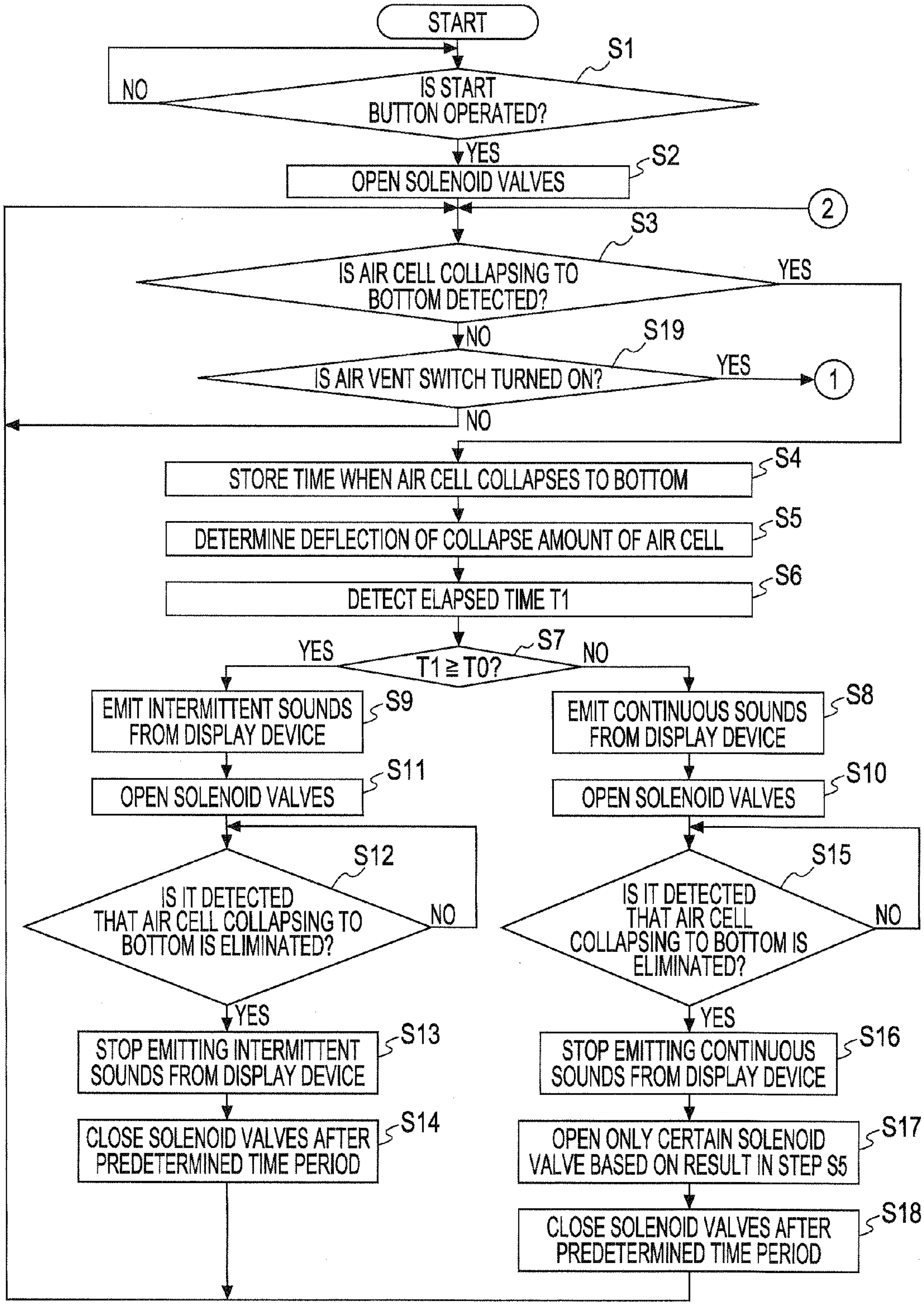
FIG. 17 is a flowchart illustrative of the operation of a controller.
Figure 18:
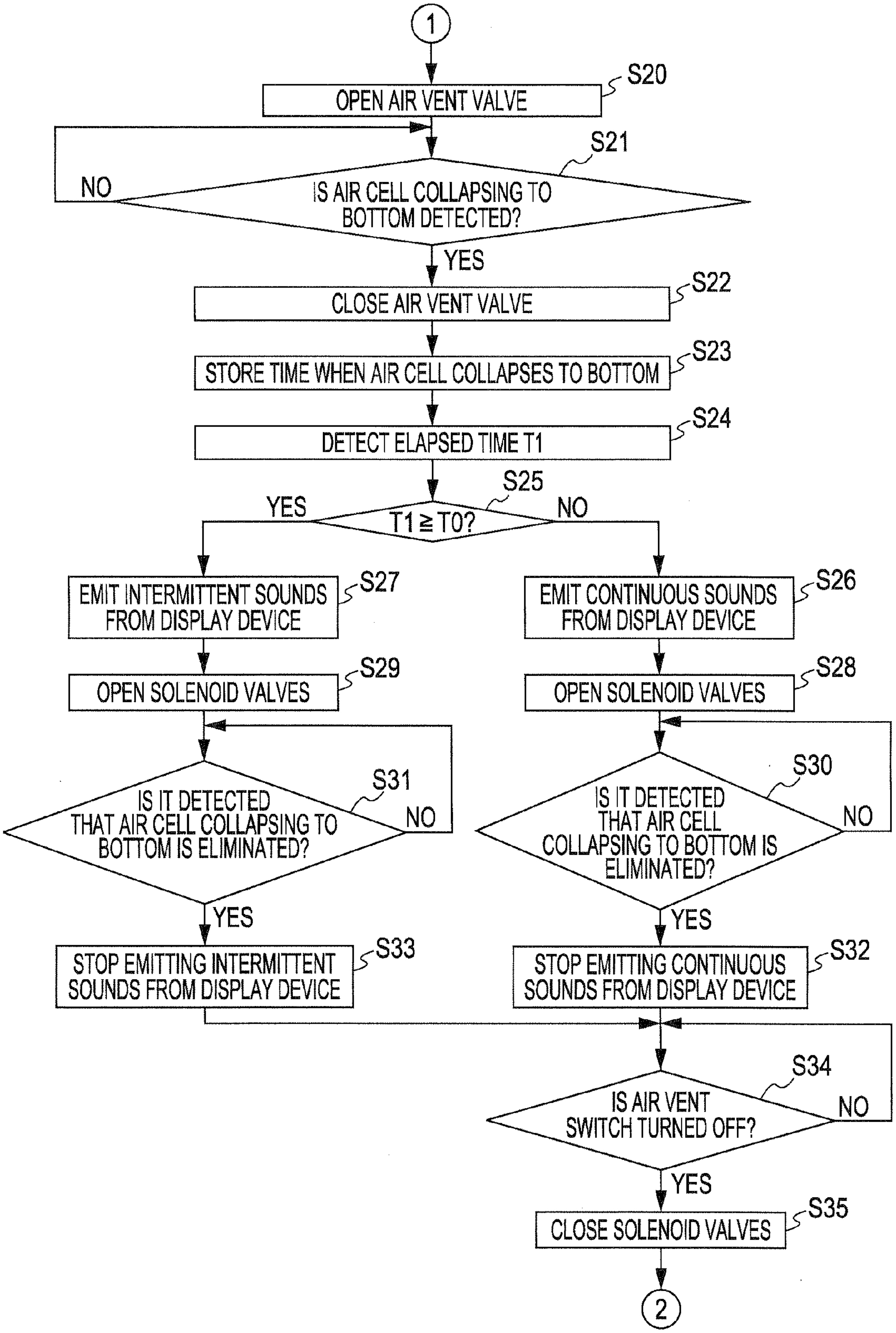
FIG. 18 is a flowchart illustrative of the operation of the controller.

FIGS. 16 to 18 illustrate a second embodiment of the present disclosure. In these drawings, components similar to those in the first embodiment are denoted with the same reference numerals and signs.

An air cellular cushion according to the second embodiment includes an air vent switch 64, in addition to the configuration of the first embodiment. This air vent switch 64 is connected to a controller 60. The air vent switch 64 can be arbitrarily operated by the user, the nurse, or the like. An air vent valve 42 formed of a solenoid valve is connected to the controller 60.

Next, the operation of the controller 60 according to the second embodiment will be described with reference to flowcharts of FIGS. 17 and 18. It is noted that the flowcharts of FIGS. 17 and 18 are connected to each other with numbers "1" and "2" shown in the drawings.

First, as in the first embodiment, when the user sitting on the cushion, the nurse, or the like operates a start button 61 (S1), the controller 60 opens solenoid valves 51, 52, 53, and 54 (S2). Thus, the insides of air cells A1, A2, A3, and A4 communicate with each other. Therefore, pressures inside the air cells A1, A2, A3, and A4 are made nearly equal to each other.

After that, the controller 60 performs the operations shown in Steps S3 to S18 in FIG. 17. However, the controller 60 determines the operating state of the air vent switch 64 after the operation of detecting the collapse of air cells to the bottom (S19). That is, in the case where the air vent switch 64 is not operated (the air vent switch 64 is off), when it is detected that air cells collapse to the bottom (S3), the controller 60 performs the operations in Step S3 to S18 shown in FIG. 17. It is noted that since the operations in Step S3 to S18 are similar to those in the first embodiment, the description thereof is omitted.

On the other hand, in the case where the user, the nurse, or the like turns on the air vent switch 64 in Step S19, the controller 60 opens the air vent valve 42 (S20). Thus, an external pressure such as the user's weight is applied to the air cells A1, A2, A3, and A4. Therefore, air inside the air cells A1, A2, A3, and A4 is evacuated from the air vent valve 42 to the outside. When it is detected that air cells collapse to the bottom (S21), the controller 60 closes the air vent valve 42 (S22), and stores the detected time in the storage device 62 (S23).

In the case where one or more of switches previously detect that air cells collapse to the bottom, this detected time (the previous detected time) is stored in Step S23. The controller 60 measures an elapsed time T1 from this previous detected time to the detected time (the detected time this time) at which the collapse of the air cells to the bottom is detected in Step S21 (S24). The controller 60 then compares this elapsed time T1 with a predetermined time period T0 (S25). In the case where the elapsed time T1 is shorter than the predetermined time period T0, the controller 60 controls the display device 63 to emit continuous sounds (S26). In the case where the elapsed time T1 is the predetermined time period T0 or more, the controller 60 controls the display device 63 to emit intermittent sounds (S27). In any case, the controller 60 opens the solenoid valves 51, 52, 53, and 54 (S28 and S29).

Thus, the user, the nurse, or the like can know that air cells collapse to the bottom. As a result, the user, the nurse, or the like can eliminate the collapse of the air cells to the bottom by supplying air to the air cells A1, A2, A3, and A4 using an air pump 40. At this time, all the solenoid valves 51, 52, 53, and 54 are opened. Therefore, it is possible to supply air to all the air cells A1, A2, A3, and A4 until the pressure reaches a desired air pressure. Subsequently, when it is detected that the collapse of the air cells to the bottom is eliminated by supplying air (S30 and S31), the controller 60 causes the display device 63 to stop emitting continuous sounds or intermittent sounds (S32 and S33). When the air vent switch 64 is turned off (S34), the controller 60 closes the solenoid valves 51, 52, 53, and 54 (S35), and returns to Step S3.

As described above, according to the second embodiment, in the case where the air vent switch 64 is off, when it is detected that the collapse amount of the air cell is a predetermined amount or more, air is supplied from the air pump 40 only to the air cell group detected to have the air cells collapsing to the bottom, as in the first embodiment. As a result, it is possible to effectively eliminate the collapse of the air cells to the bottom. In the case where the air vent switch 64 is turned on, the controller 60 opens the air vent valve 42. When it is detected that the collapse amount of the air cell is a predetermined amount or more, the controller 60 closes the air vent valve 42. The controller 60 controls the solenoid valves 51, 52, 53, and 54 to supply air from the air pump 40 to all the air cells A1, A2, A3, and A4. Thus, the user, the nurse, or the like can again arbitrarily supply air to all the air cells A1, A2, A3, and A4. Therefore, in the case where the user, the nurse, or the like uses a wheelchair outdoors, for example, the air pressure of all the air cells A1, A2, A3, and A4 is set relatively high. As a result, it is possible to stably support the user's buttocks even though there are swings or vibrations in traveling. In the case where the user, the nurse, or the like uses a wheelchair indoors, for example, the air pressure of all the air cells A1, A2, A3, and A4 is set relatively low. Thus, it is possible to reduce the load on the user's buttocks due to repulsive force from the air cells even though the user is sitting on the cushion for a long hour. That is, the user, the nurse, or the like can arbitrarily adjust the air pressure of all the air cells A1, A2, A3, and A4 according to the use conditions or preference. Therefore, it is possible for the user to use the air cellular cushion (and a wheelchair equipped therewith) in more comfort.

It is noted that it is also possible to express the air cellular cushion according to the present disclosure as first to third air cellular cushions below. The first air cellular cushion includes a plurality of air cells provided to be arranged in the front-rear and width directions of the seating surface. In the air cellular cushion to be placed on a predetermined seating surface to support buttocks of a user, the air cellular cushion includes: a detector configured to detect that at least a single air cell collapses by a predetermined amount or more among the air cells; a manual type air pump; an air passage configured to supply air from the air pump to the air cells; an elapsed time measuring device configured to measure an elapsed time since it is previously detected that an air cell collapses by a predetermined amount or more in detecting that an air cell collapses by a predetermined amount or more by the detector; and a display device configured to display an event that an air cell collapses by a predetermined amount or more using a sound, a light, an image, a character or the like. In the case where the detector detects that an air cell collapses by a predetermined amount or more and an elapsed time measured by the elapsed time measuring device is shorter than a predetermined time period, the display device performs a first predetermined indication. In the case where the detector detects that an air cell collapses by a predetermined amount or more and an elapsed time measured by the elapsed time measuring device is a predetermined time period or more, the display device performs a second predetermined indication.

In this air cellular cushion, the air passage is configured to supply air from the air pump to the air cells. Thus, air is supplied from the manual type air pump, so that the air is supplied to the insides of the air cells. Therefore, the collapse amounts of the air cells are reduced.

In this air cellular cushion, in the case where the detector detects that an air cell collapses by a predetermined amount or more and an elapsed time measured by the elapsed time measuring device is shorter than a predetermined time period, the display device performs the first predetermined indication. In the case where the detector detects that an air cell collapses by a predetermined amount or more and an elapsed time measured by the elapsed time measuring device is a predetermined time period or more, the display device performs the second predetermined indication.

Here, for example, there is also the case where the user has a habit of sitting to lean to one or the other side in the width direction of the seating surface and only the air cells supporting near the ischium on the leaning side collapse by a predetermined amount or more (the air cells collapse to the bottom). In this case, the elapsed time tends to be longer. On the other hand, in the case where a micro air leakage occurs in the air cell, the air passage, the air pump, or the like, the elapsed time tends to be shorter.

That is, in the case where the first predetermined indication is performed, the elapsed time is short. Thus, a micro air leakage is highly likely to occur in the air cell, the air passage, or the like. Air is supplied from the air pump, so that the air is supplied to the inside of the air cell, and the collapse amount of the air cell is reduced. Therefore, in the case where the first predetermined indication is performed, air is supplied using the air pump, so that the collapse of the air cell to the bottom is eliminated.

In the case where the second predetermined indication is performed, the elapsed time is long. Thus, only the air cells supporting near the ischium on the leaning side are highly likely to collapse by a predetermined amount or more because of the user's habit of sitting to lean. Therefore, the user's buttocks are temporarily moved upward to the positions at which the user's buttocks do not contact with air cells and the user is then again seated on the cushion, so that it is possible to move air from the other air cells to the air cells collapsing to the bottom. That is, appropriate steps are taken based on the indication state of the display device, so that it is possible to effectively eliminate the collapse of air cells to the bottom caused by the user's posture.

The second air cellular cushion includes a plurality of air cells provided to be arranged in the front-rear and width directions of the seating surface. In the air cellular cushion to be placed on a predetermined seating surface to support buttocks of a user, the air cellular cushion includes: a detector configured to detect that at least a single air cell collapses by a predetermined amount or more among the air cells; a manual type air pump; an air passage configured to supply air from the air pump to the air cells; a pressure sensor configured to measure a pressure inside the air cell or the air passage; a pressure change rate measuring device configured to measure a pressure change rate measured by the pressure sensor; and a display device configured to display an event that an air cell collapses by a predetermined amount or more using a sound, a light, an image, a character or the like. In the case where the detector detects an event that an air cell collapses by a predetermined amount or more and a change rate measured by the pressure change rate measuring device is faster than a predetermined rate, the display device performs a first predetermined indication. In the case where the detector detects an event that an air cell collapses by a predetermined amount or more and a change rate measured by the pressure change rate measuring device is a predetermined rate or less, the display device performs a second predetermined indication.

Here, for example, there is also the case where the user has a habit of sitting to lean to one or the other side in the width direction of the seating surface and only the air cells supporting near the ischium on the leaning side collapse by a predetermined amount or more (the air cells collapse to the bottom). In this case, the pressure change rate tends to be slow. On the other hand, in the case where a micro air leakage occurs in the air cell, the air passage, the air pump, or the like, the pressure change rate tends to be fast.

As a result, in the case where the first predetermined indication is performed, the pressure change rate is fast. Thus, a micro air leakage is highly likely to occur in the air cell, the air passage, or the like. Air is supplied from the air pump, so that the air is supplied to the inside of the air cell, and the collapse amount of the air cell is reduced. Therefore, in the case where the first predetermined indication is performed, air is supplied using the air pump, so that the collapse of the air cell to the bottom is effectively eliminated.

In the case where the second predetermined indication is performed, the pressure change rate is slow. Thus, only the air cells supporting near the ischium on the leaning side are highly likely to collapse by a predetermined amount or more because of the user's habit of sitting to lean. Therefore, the user's buttocks are temporarily moved upward to the positions at which the user's buttocks do not contact with air cells, and the user is then again, seated on the cushion, so that it is possible to move air from the other air cells to the air cells collapsing to the bottom. That is, appropriate steps are taken based on the indication state of the display device, so that it is possible to effectively eliminate the collapse of air cells to the bottom caused by the user's posture.

The third air cellular cushion includes a plurality of air cells provided to be arranged in the front-rear and width directions of the seating surface. In the air cellular cushion to be placed on a predetermined seating surface to support buttocks of a user, the air cellular cushion includes: an air cell group on one side in the width direction formed of a part of air cells among the air cells to support the user's buttocks on one side in the width direction; an air cell group on the other side in the width direction formed of another part of air cells among the air cells to support the user's buttocks on the other side in the width direction; a detector configured to detect that two or more of air cells collapse by a predetermined amount or more in the width direction of the seating surface, the two or more of air cells being at different positions; a determiner configured to determine whether the collapse amount of each of the air cells deflects to one side or the other side in the width direction of the seating surface based on the detected result when the detector performs detection; a manual type air pump: an air passage configured to supply air from the air pump to the air cells and supply air from the air pump to the air cell groups; a solenoid valve configured to switch opening and closing of the air passage from the air pump to the air cell groups, the solenoid valve being provided in the air passage; and a controller configured to control the solenoid valve such that air from the air pump is supplied to all the air cells including the air cell groups when the detector detects that one or more of the air cells collapse by a predetermined amount or more and control the solenoid valve such that the air passage from the air pump to at least one of the air cell groups is opened for a predetermined time period since no collapse is detected based on the determined result by the determiner when the detector detects that no air cell collapses by a predetermined amount.

In this air cellular cushion, the solenoid valve can switch opening and closing of the air passage from the air pump to the air cell groups. Thus, it is also possible to supply air from the air pump only to the air cell group on one side in the width direction by switching the solenoid valve. It is also possible to supply air only to the air cell group on the other side in the width direction. It is also possible to supply air to both of the air cell groups.

When the detector performs detection, the determiner determines whether the collapse amount of each of the air cells deflects to one side or the other side in the width direction of the seating surface. The solenoid valve is controlled such that air from the air pump is supplied to all the air cells including the air cell groups. When the detector detects that no air cell collapses by a predetermined amount, the solenoid valve is controlled such that the air passage to at least one of the air cell groups is opened for a predetermined time period since no collapse is detected, based on the determined result by the determiner.

Thus, for example, in the case where the user has a habit of sitting to lean to one side in the width direction of the seating surface and only the air cells supporting near the ischium on the leaning side collapse by a predetermined amount or more (the air cells collapse to the bottom), the detector performs detection and it is determined that the collapse amount of each of the air cells deflects to one side in the width direction of the seating surface, for example. The solenoid valve is controlled such that air from the air pump is supplied to all the air cells including the air cell groups. Therefore, air is supplied from the air pump, so that the air is supplied to the insides of all the air cells. The air is supplied to the insides of all the air cells, so that when the detector detects that no air cell collapses by a predetermined amount, the air passage from the air pump to the air cell group on one side in the width direction of the seating surface, for example, is opened for a predetermined time period since no collapse is detected, based on the determined result by the determiner. Consequently, air is supplied from the air pump, so that it is possible to increase the air quantity of the air cell group in the area in which the user tends to lean because of the user's habit. That is, it is possible to make the user's posture difficult to lean. Thus, it is possible to effectively eliminate the collapse of air cells to the bottom caused by the user's posture.

According to the first to third air cellular cushions of the present disclosure, it is possible to effectively eliminate the collapse of air cells to the bottom. Therefore, it is possible to favorably prevent the development of decubitus ulcers in the user.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. An air cellular cushion comprising:
a plurality of air cells;
a sensor configured to detect an air cell collapsing to a bottom;
a parameter measuring unit configured to measure a parameter indicating a collapse state of the air cell collapsing to the bottom;
an indicator configured to output an indication; and
a control unit configured to compare a parameter value measured by the parameter measuring unit with a predetermined value set in advance, and to change the indication output from the indicator based on a comparison result.

2. The air cellular cushion according to claim 1, wherein
the parameter is a time interval in which an air cell collapses to the bottom, and
the control unit causes the indicator to output a first indication in a case where the time interval is shorter than a predetermined time period, whereas the control unit causes the indicator to output a second indication in a case where the time interval is the predetermined time period or more.

3. The air cellular cushion according to claim 2, wherein
the time interval is a time elapsed from a time detected by the sensor when an air cell has previously collapsed to the bottom to a time at which the sensor has detected that the air cell has collapsed to the bottom this time.

4. The air cellular cushion according to claim 1, wherein
the air cell has an air bag formed of a flexible material and a base member configured to support the air bag, and
the base member is provided with the sensor.

5. The air cellular cushion according to claim 1,
wherein the indicator outputs an indication including at least one selected from the group consisting of a sound, a light, an image, and a character.

6. The air cellular cushion according to claim 1, further comprising a storage device,
wherein the storage device stores a measured result of the parameter measuring unit.

7. The air cellular cushion according to claim 1,
wherein the control unit is a microcomputer.

8. The air cellular cushion according to claim 1. wherein
the air cellular cushion is placed on a predetermined seating surface to support buttocks of a user, and
the air cells are provided to be arranged in a front-rear direction and a width direction of the seating surface.

9. The air cellular cushion according to claim 1, further comprising an air supply unit configured to supply air to the air cells.

10. The air cellular cushion according to claim 9, wherein
the air cells include a. first air cell group formed in a first lateral side in the air cellular cushion and a second air cell group formed in a second lateral side in the air cellular cushion, and
the air supply unit is configured to individually supply air to the air cell groups.

11. The air cellular cushion according to claim 10,
wherein the air supply unit includes:
an air pump;
an air passage configured to connect the air pump to the air cells; and
an on-off valve provided in the air passage.

12. The air cellular cushion according to claim 11,
wherein the air pump is a manual type pump.

13. The air cellular cushion according to claim 11, further comprising:
an air vent valve configured to evacuate air inside the air cells to an outside; and
an air vent switch,
wherein the control unit controls the on-off valve so that the air vent valve is opened in a case where the air vent switch is turned on, whereas the control unit controls the on-off valve so that the air vent valve is closed and air is supplied to all the air cells in a case where the sensor detects an air cell collapsing to the bottom.

14. The air cellular cushion according to claim 11,
wherein the on-off valve is a solenoid valve.

15. The air cellular cushion according to claim 11, wherein
the sensor is configured to detect a position of an air cell collapsing to the bottom, and
in a case where the control unit determines that the air cell collapsing to the bottom is distributed to deflect to any of the first lateral side and the second lateral side based on a detected result of the sensor, the control unit controls the on-off valve so that the deflection of the distribution of the air cell collapsing to the bottom is relaxed.

16. The air cellular cushion according to claim 15, wherein
in a case where the sensor detects an air cell collapsing to the bottom, the control unit controls the on-off valve so that air is supplied to all the air cells, and
in a case where the sensor then detects no air cell collapsing to the bottom, the control unit controls the on-off valve so that air is supplied to an air cell group including more air cells collapsing to the bottom for a predetermined time period than those included in other cell groups.

17. The air cellular cushion according to claim I, wherein
the parameter is a rate of change in pressure of an air cell collapsing to the bottom, and
the control unit causes the indicator to output a first indication in a case where the rate of change is faster than a predetermined rate, whereas the control unit causes the indicator to output a second indication in a case where the rate of change is the predetermined rate or less.

18. The air cellular cushion according to claim 17, further comprising:
a pressure sensor,
wherein the pressure sensor detects the rate of change in pressure when an air cell collapsing to the bottom is detected.

19. A wheelchair comprising the air cellular cushion according to claim 1.

* * * * *